US00RE44816E

(19) United States
(12) Reissued Patent
Gioia et al.

(10) Patent Number: US RE44,816 E
(45) Date of Reissued Patent: Mar. 25, 2014

(54) BARRIER MOVEMENT OPERATOR INCLUDING TIME TO CLOSE FEATURE

(75) Inventors: William Gioia, Winfield, IL (US); Eric J. Robb, Carol Stream, IL (US); David Stafford, Lake Jackson, TX (US); Robert S. Study, III, Chicago, IL (US)

(73) Assignee: The Chamberlain Group, Inc., Elmhurst, IL (US)

(21) Appl. No.: 13/118,958

(22) Filed: May 31, 2011

Related U.S. Patent Documents

Reissue of:
(64) Patent No.: 7,091,688
Issued: Aug. 15, 2006
Appl. No.: 11/139,451
Filed: May 27, 2005

U.S. Applications:
(63) Continuation of application No. 10/417,594, filed on Apr. 17, 2003, now Pat. No. 7,034,484.

(51) Int. Cl.
*G05B 5/00* (2006.01)

(52) U.S. Cl.
USPC ..... 318/466; 318/266; 318/280

(58) Field of Classification Search
USPC ..... 318/466, 266, 286, 280, 467, 468, 469, 318/445, 480, 450, 460, 282
See application file for complete search history.

(56) References Cited

U.S. PATENT DOCUMENTS

| | | | | |
|---|---|---|---|---|
| 2,287,422 | A | 6/1942 | Field | |
| 3,319,696 | A | 5/1967 | Wiegand | |
| 4,360,801 | A | 11/1982 | Duhame | |
| 4,463,292 | A | 7/1984 | Engelmann | |
| 5,027,553 | A | 7/1991 | Vergara | |
| 5,510,686 | A | 4/1996 | Collier | |
| 6,046,562 | A | 4/2000 | Emil | |
| 6,075,333 | A | 6/2000 | Huddle | |
| 6,133,703 | A | 10/2000 | Fitzgibbon et al. | |
| 6,326,754 | B1 | 12/2001 | Mullet et al. | |
| 6,346,889 | B1 | 2/2002 | Moss | |
| 6,388,412 | B1 | 5/2002 | Reed et al. | |
| 6,400,112 | B1 | 6/2002 | Fitzgibbon et al. | |
| 6,469,464 | B1 | 10/2002 | McCall | |
| 6,563,278 | B2 * | 5/2003 | Roman | 318/282 |

(Continued)

FOREIGN PATENT DOCUMENTS

| | | | |
|---|---|---|---|
| GB | 2338360 | A | 12/1999 |
| GB | 2372866 | A | 4/2002 |

OTHER PUBLICATIONS

Jap Controls UK; Motor and Control Unit Installation Manual, Zap 800 and 8800 Series QukFit Sectional Door (Jack Shaft) Operations; Oct. 2007.

(Continued)

*Primary Examiner* — Karen Masih
(74) *Attorney, Agent, or Firm* — Fitch Even Tabin & Flannery LLP

(57) ABSTRACT

Methods and apparatus for controlling a barrier movement operator having a timer-to-close feature are disclosed. The methods and apparatus include arrangements for conveniently inhibiting and re-activating the timer-to-close feature and for providing a mid-stop position during movement toward the closed position. Additionally, the embodiments include methods and apparatus for reversing barrier operation.

27 Claims, 4 Drawing Sheets

(56) References Cited

U.S. PATENT DOCUMENTS

| | | | | |
|---|---|---|---|---|
| 6,819,071 | B2 | 11/2004 | Graham et al. | |
| 6,828,745 | B1 | 12/2004 | Valente et al. | |
| 6,833,681 | B2 | 12/2004 | Fitzgibbon | |
| 7,034,484 | B2 | 4/2006 | Gioia et al. | |
| 7,109,677 | B1 * | 9/2006 | Gagnon et al. | 318/466 |
| 7,579,797 | B2 | 8/2009 | Robb et al. | |
| 7,755,223 | B2 | 7/2010 | Fitzgibbon | |
| 2004/0227410 | A1 | 11/2004 | Fitzgibbon | |
| 2006/0012325 | A1 | 1/2006 | Robb et al. | |

OTHER PUBLICATIONS

British Patent Application No. GB0408558.5; Search Report Under Section 17 Dated Aug. 24, 2004, 1 page.
British Patent Application No. GB0601313.0; Search Report Under Section 17 Dated Aug. 24, 2006, 1 page.
British Patent Application No. GB0601320.5; Search Report Under Section 17 Dated Aug. 30, 2006, 1 page.
Letter from A. Sidney Katz regarding invalidity contentions of U.S. Patent Nos. 7,034,484 and 7,091,688, Aug. 6, 2009, 52 pages.
ZAP Controls UK, Jackshaft Motor-Control System for Residential Garage Doors, Model 815-RL, Installation Instructions, Dec. 2005, 25 pages.
ZAP Controls UK, Jackshaft Motor-Control System for Residential Garage Doors, Model 815-RL, User Operating Instructions, Nov. 2005, 8 pages.
ZAP Controls UK, Jackshaft Motor-Control System for Residential Garage Doors, Model 815-RL, Installation Instructions, Aug. 2006, 26 pages.
ZAP Controls UK, Jackshaft Motor-Control System for Residential Garage Doors, Model 815-RL, User Operating Instructions, Aug. 2006, 9 pages.

* cited by examiner

BARRIER MOVEMENT OPERATOR INCLUDING TIME TO CLOSE FEATURE

Matter enclosed in heavy brackets [ ] appears in the original patent but forms no part of this reissue specification; matter printed in italics indicates the additions made by reissue.

The present application is a *reissue application of U.S. Pat. No. 7,091,688 filed May 27, 2005 and issued Aug. 15, 2006, which is a* continuation of application Ser. No. 10/417,594 filed Apr. 17, 2003*, now U.S. Pat. No. 7,034,484 issued Apr. 25, 2006,* which is incorporated herein by reference in its entirety.

BACKGROUND

The present invention relates to barrier movement operators and particularly to such operators which include a timer-to-close feature.

Barrier movement operators are known which include a motor for moving a barrier between open and closed positions and a controller for selectively energizing the motor to move the barrier. Gate operators and garage door operators are examples of the wide range of such barrier movement operators. The controller of a barrier operator may be responsive to stimulus signals to perform various barrier movements with safety. For example, the barrier operator may include a control switch which, when pressed, reverses the direction of travel of the barrier or starts the barrier moving toward the open or closed position.

Most door movement has, for safety concerns, been under the control of a human operator. That is the barrier was opened or closed only when a human was present to provide a movement initiating stimulus. The human, being aware of the environment was a significant part of safely moving the barrier. Humans, however, are not infallible and occasionally the barrier is left open when it should be closed. Doing so may be energy inefficient by allowing heat or cool to escape from a space which should be a closed interior or it may be unwise because unauthorized persons may enter the area to be protected by the barrier.

In order to combat the problem of a left-open barrier, some systems include a timer-to-close feature. This feature generally includes a timer which is enabled when the barrier is in the open position. When the timer indicates that the barrier has remained open for a predetermined period of time, the barrier operator motor is energized to move the barrier to the closed position. A barrier movement operator with a timer-to-close feature is generally equipped with special safety equipment like an alerting light and/or audible signal which are activated prior to moving the barrier to the closed position.

It may be desirable for a user to pause the timer-to-close feature for reasons such as airing out the interior space of which a human user is in control. Known systems with a timer-to-close feature generally provide no user controlled ability to pause the feature without shutting the feature off, requiring at least a complete recycle of the barrier or even a reprogramming of the parameters of the feature. A need exists for a more convenient arrangement for pausing a timer-to-close feature.

Further, known operators having a timer-to-close feature move the barrier directly from the open to the closed position. Such may not always be desirable either for reasons of safety or for reasons predicted by a human operator. A need also exists for a human controlled capability to move the barrier first to a mid-travel stopping point, then to the closed position.

DESCRIPTION

Figure 1:
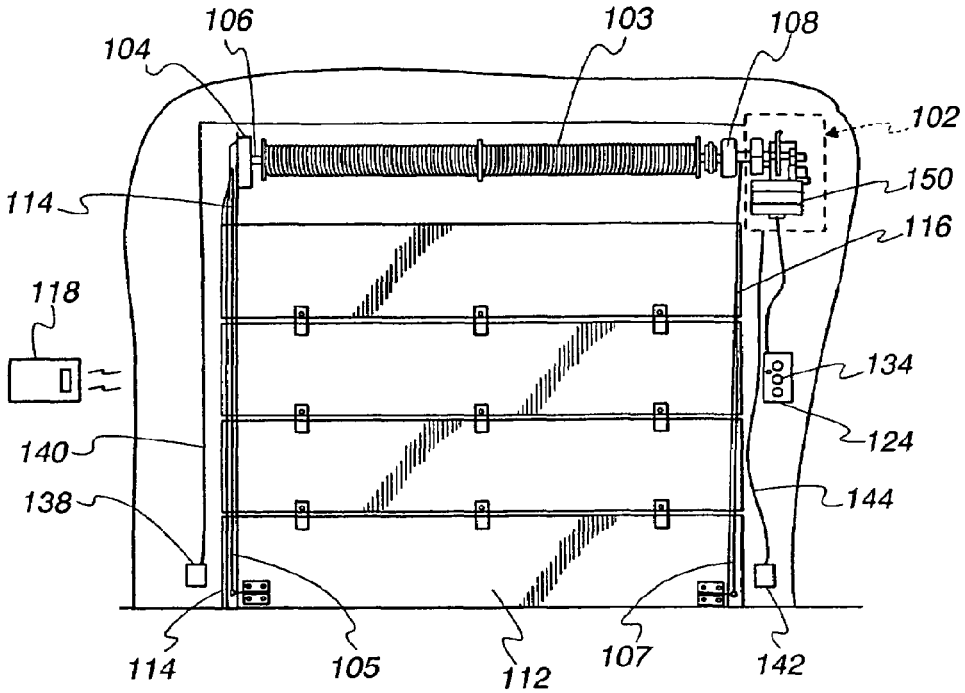
FIG. 1 is a view of a barrier movement operator.

FIG. 1 is a view of a barrier movement operator embodying the present invention. FIG. 1 shows a jack shaft balanced, powered jack shaft moved residential garage door movement operator. It will be understood from the following that the improvements described and claimed herein apply to other types of barrier movement systems such as commercial door operators, rolling gate operators, swinging gate operators, other types of balancing such as tension spring, and other types of movement such as high lift and powered rail and trolley.

Figure 2:
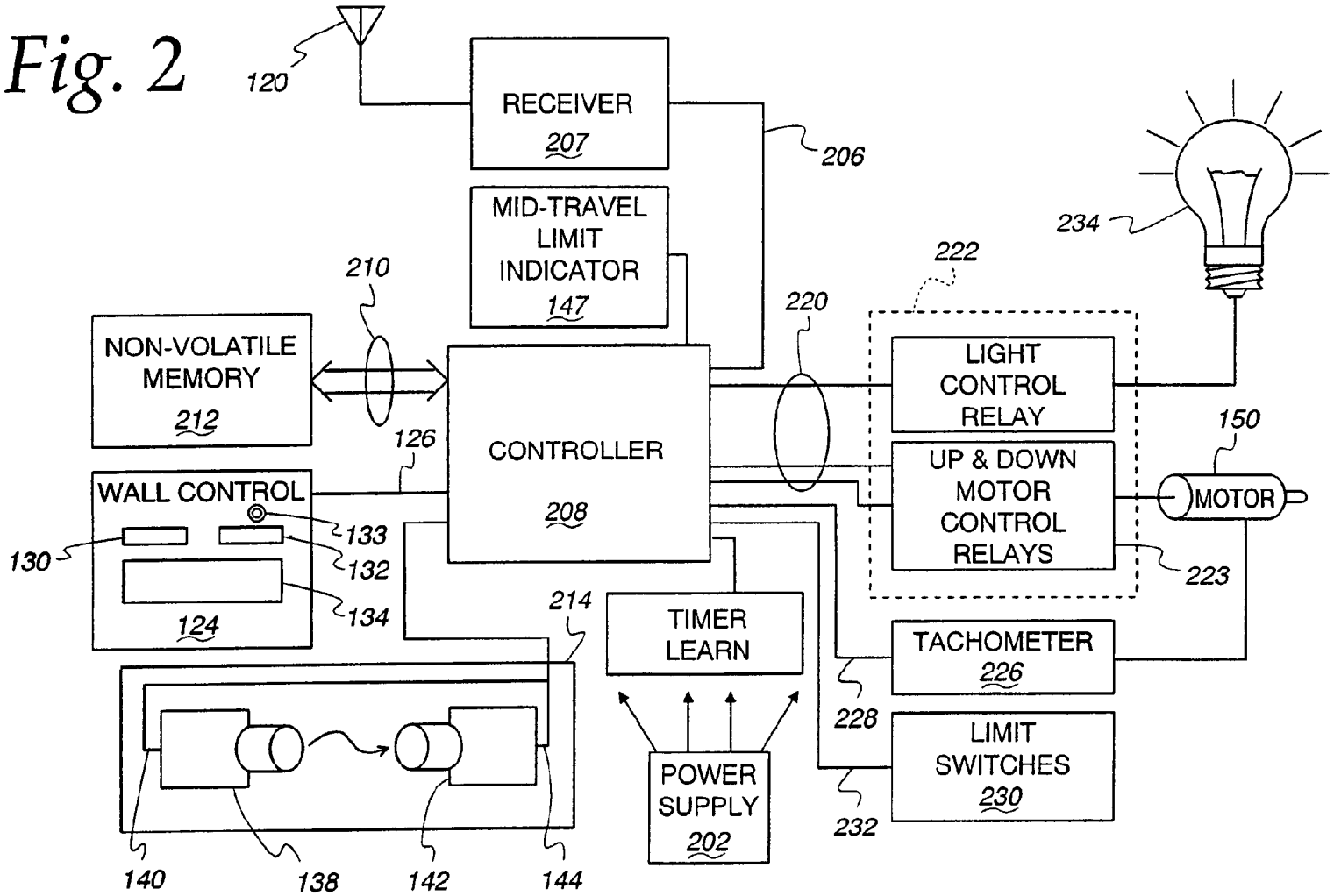
FIG. 2 is a block diagram of a controller of the barrier movement operator and apparatus which interacts with the controller.

In the embodiment of FIG. 1, a panel door 112 is raised and lowered in a pair of side tracks 114 and 116. Door 112 is connected by cables 105 and 107 to a pair of drums 104 and 108 disposed on a jack shaft 106 and rotated under the power of a motor 150 contained by a head end 102. The motor is selectively energized by a controller 208 and associated apparatus (FIG. 2) to move the door 112 between a closed position, as shown in FIG. 1, and an open position. The controller 208, which includes a programmed microprocessor, responds to user input signals from a wall control 124 and an rf transmitter 118 to initiate door movement. Obstructions to door movement may be detected by an optical transmitter 138 and receiver 142 which "watch" the door opening to detect when an obstruction is beneath the door. Similarly, an optional door edge sensor (not shown) may be attached to the bottom of the door to detect physical contact with an obstruction.

Figure 3:
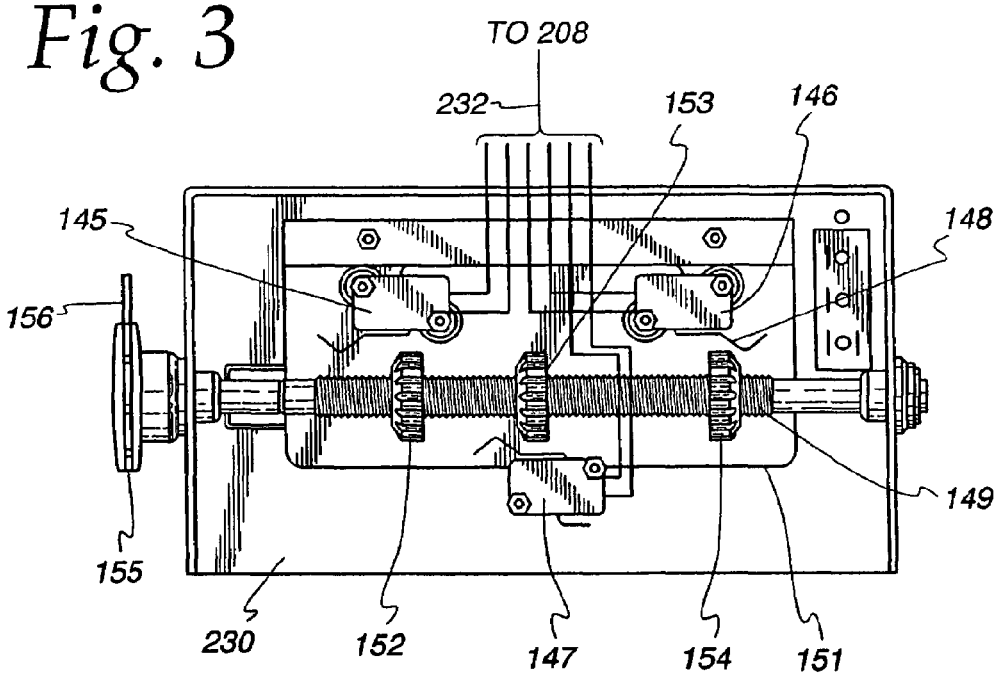
FIG. 3 represents apparatus for defining particular points of barrier travel.

When the barrier movement system is installed, the controller 208 is taught the open and closed positions of the door by known means so that the motor 150 is energized only long enough to move the door between those limit positions. Such limit positions may be learned in the software and data of controller 208, they may consist of physical door detectors mounted to the rails, the garage, or the door, or they may be physical switches within head end 102 which sense the movement of representations of the door position. FIG. 3 represents one apparatus internal to the head end for setting limits of door travel.

The limit setting arrangement of FIG. 3 comprises a first limit switch 145, a second limit switch 146, and a third limit switch 147. Each limit switch includes an actuator lever, e.g., 148, which responds to contact by causing its associated switch to change from an open to a closed electrical state. The state of all switches is reported to controller 208 via a communication path 232. Also included is a threaded shaft 149 which is connected to the output shaft of motor 150 to rotate therewith. In FIG. 3, the shaft is connected to motor 150 by means of a pulley 155 and belt 156. Threaded onto shaft 149 are three switching cogs 152, 153, and 154 which are kept from rotating during normal operation by a guide rail (not shown) attached to a mounting plate 151.

The open and closed limits are set by cogs 152 and 154. They are set by lowering the door to the closed position, displacing mounting plate 151 so that the cogs are free to rotate, and rotating cog 152 until switch 145 changes state. Similarly, the open limit is set by moving the door to the open position and adjusting cog 154 until switch 146 changes state. After setting open and closed limits, controller 208 can accurately control barrier movement.

After the barrier operator is installed, a user may press the command button 134 of wall control which signals controller 208 via a path 126. Controller assesses the present state of the barrier based on various inputs discussed and sends a signal on a communication path 220 to control relays 222 which apply power to motor 150. For example, when the barrier 112 is at the open limit and push button 134 is pressed, controller 208 energizes relays 222 to energize motor 150 to move the barrier toward the closed limit. During such movement the optical sensors 138 and 142, and other safety equipment, are surveyed to assure safe movement of the door. A user can also initiate barrier movement by rf transmitting an appropriate security code from a transmitter 118 in a manner well known in the art. Such an rf transmission is received by a receiver 207 via an antenna 120 and the resultant received signal is sent on to controller 208. A non-volatile memory 212 stores previously learned security codes and when a match exists between a previously learned code and a received code, the controller operates the door in the same manner as if button 134 of wall control 124 had been pressed.

The present embodiment includes a timer-to-close feature which is in part implemented with routines to be performed by controller 208. The timer-to-close feature automatically moves the barrier toward the closed position when the barrier has been in the open position for a predetermined period of time. The predetermined period of time may be preset and stored in controller 208 at the time of manufacture or it may be established by known user controlled methods during installation. The present embodiment adds to the timer-to-close feature by permitting the user to conveniently inhibit operation of this feature. A switch 132 of wall control 134 is used to enable and disable the timer-to-close feature.

Figure 4:
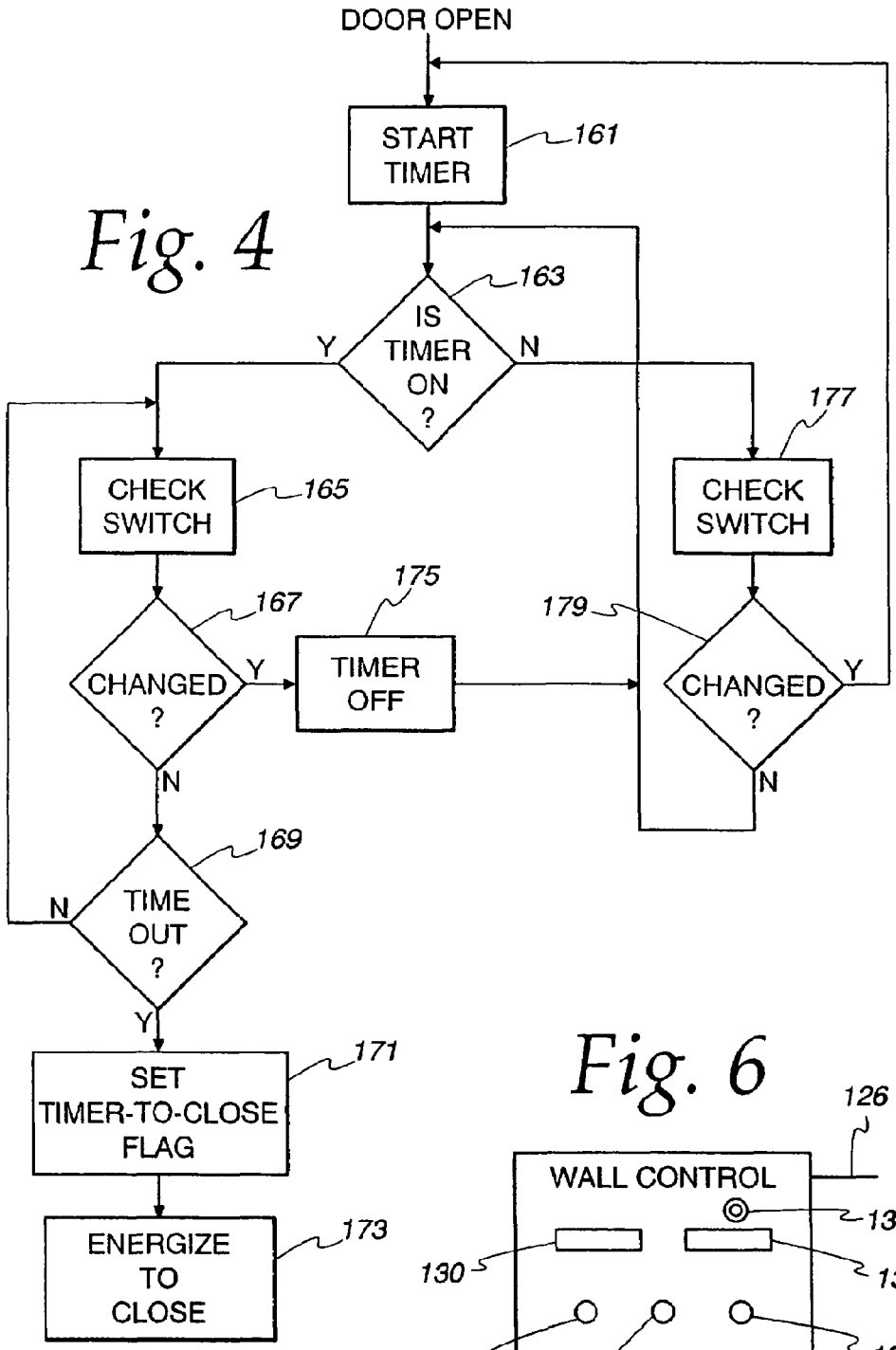
FIG. 4 is a flow diagram of the inhibiting of a timer-to-close feature.

FIG. 4 is a flow diagram of an embodiment of the timer-to-close feature. The flow begins at block 161 which is entered whenever the door achieves the open position. In block 161 the timer-to-close timer is started. Flow proceeds to block 163 in which when a determination is made as to whether the timer is active. When the timer is active, flow proceeds to blocks 165 and 167 where switch 132 is checked to see if it has been pressed by a user. If not, flow proceeds to block 169 to determine whether the timer has reached the predetermined time out value. If it has not, flow returns to block 165. As long as the switch 132 is not pressed, the loop of blocks 165, 167, and 169 continues until time out is detected in block 169, and flow proceeds to block 171 where a timer-to-close flag is set indicating that door closing movement was begun by the timer-to-close time out. The motor 150 is then energized in block 173 to move the door toward the closed position. When the door reaches the closed position, the timer-to-close flag is reset.

Should a user press button 132 while the loop of blocks 165, 167, and 169 is being executed, flow proceeds from block 167 to block 175 where the timer is turned off, which in the present embodiment includes resetting the timer. From block 175 flow returns to block 163 and on to blocks 177 and 179 where the state of switch 132 is again checked. When there has been no change, flow returns to block 163 and a loop consisting of blocks 163, 177 and 179 is repeatedly executed. Whenever block 179 detects a press of button 132, flow proceeds to block 161 where the timer is again started and flow continues as previously described. Optionally the wall control 124 may include an LED 133 which is energized by controller 208 when the timer-to-close is being inhibited and is not energized when timer-to-close is in the normal mode.

Figure 5:
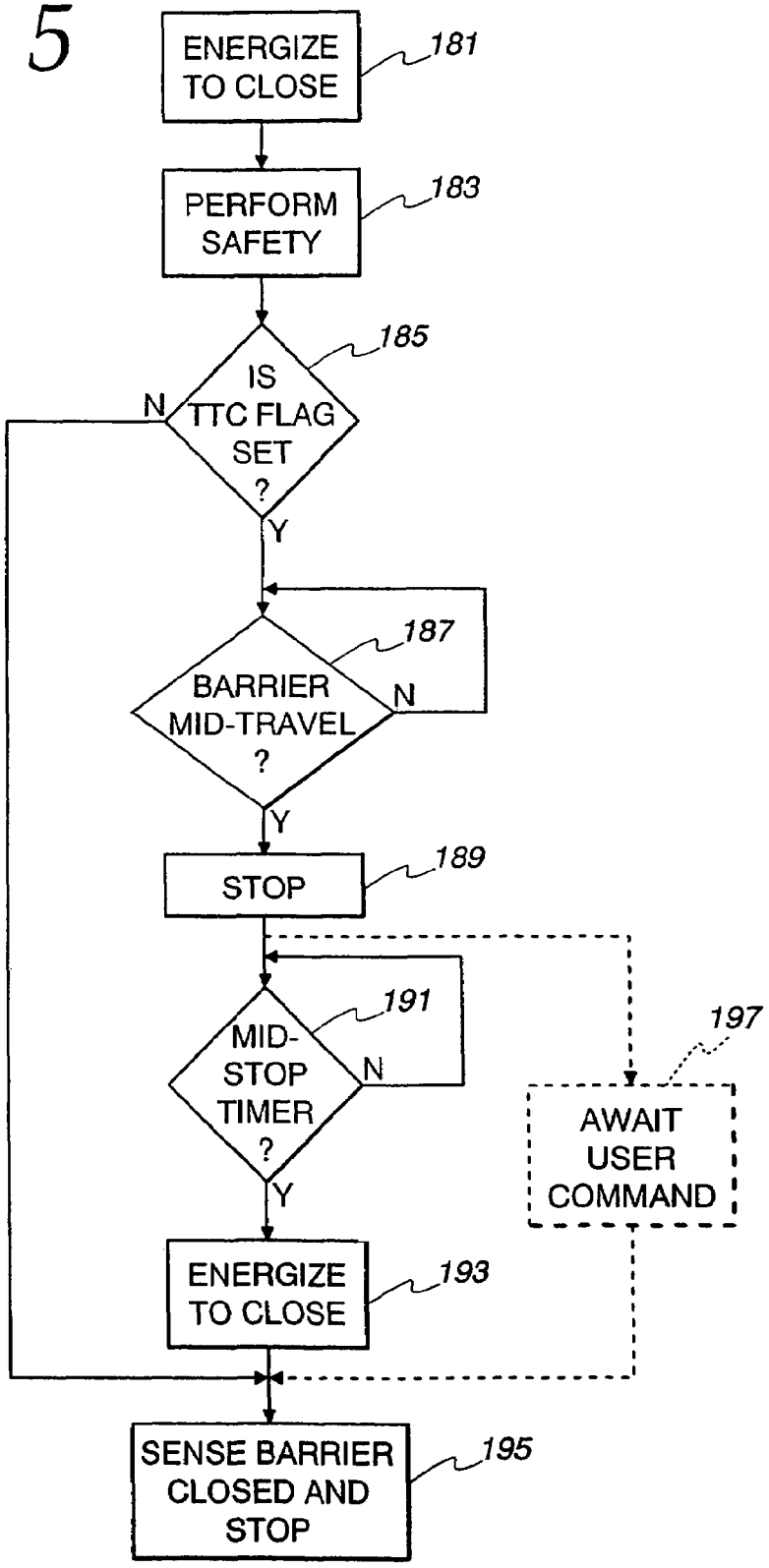
FIG. 5 is a flow diagram of barrier movement with a mid-travel point defined.

As discussed with regard to FIG. 3, the barrier movement operator described herein includes a limit switch 147 and corresponding limit cog 153 which may be adjusted to identify to controller 208 a position of the barrier intermediate to the positions identified by switches 145 and 146. The point at which switch 147 changes state is adjusted in the manner described previously with regard to switches 145 and 146. With such adjustment, the controller 208 will be informed each time the door passes the intermediate position while moving between open and closed positions. In the present embodiment, the passage of the intermediate position while the door is traveling upwardly toward the open position is ignored by controller. FIG. 5 is a flow diagram representing downward or closing movement of the barrier during which the intermediate position is responded to.

The routine of FIG. 5 is performed each time the motor 150 is energized to move the barrier from the open position toward the closed position. The routine begins with the energization of motor 150 for downward motion in block 181. A block 183 is performed throughout downward door movement to assure door movement safety. A decision block 185 is next performed to identify if the timer-to-close flag has been set. It will be remembered that the timer-to-close flag is set in block 171 (FIG. 4) when the downward motion is initiated by time out of the timer-to-close timer. When block 185 determines that the timer-to-close flag is set, flow proceeds to block 187 where a loop is performed until the mid-travel position set by switch 147 is detected. When the mid-travel position is reached, flow proceeds to block 189 and the motor is stopped to await a mid-travel time out in block 191, at which point the motor is re-energized in block 193 and finally closed in block 195. When block 185 determines that the barrier is moving toward the closed position for reasons other than the timer-to-close (such as in response to a user command), flow proceeds from block 185 to continue its closing the barrier without regard for the mid-travel position.

In the embodiments discussed above, the barrier waits at mid-travel until a timer re-initiates door movement as represented in blocks 191 and 193. Alternatively, blocks 191 and 193 could be replaced with a single block 197 (shown in dotted line on FIG. 5) in which a user command is awaited to re-energize the motor.

Motor 150 can be energized to rotate either clockwise or counter-clockwise by power provided from an up and down motor control relay unit 223 of relays 222. Whenever the barrier is to be moved, controller 208 transmits to the motor control relay unit 223 an appropriate set of signals to control relays 223 to rotate the motor in either the clockwise or counter-clockwise. The choice of clockwise, counter-clockwise rotation is made by controller 208 operating under preprogrammed parameters which are set using assumptions about the installation of the operator. It is possible that, because of decisions made during installation a control signal which causes the motor to rotate counter-clockwise will move the barrier toward the wrong limit. That is, the controller 208 may send a signal to relays 223 which is intended to raise a barrier and the result is that the barrier is lowered.

Wall control unit 124 includes a two position switch in which one position indicates normal barrier travel and the other position indicates the reverse barrier travel. Whenever the barrier motor is to be energized, the controller 208 consults the switch 130 to determine whether the motor is to be energized normally i.e., in accordance with pre-programmed parameters, or in the reverse. For example, by pre-programming, controller 208 may direct the motor to rotate clockwise to move a barrier from open to closed position, and the installed gearing of the motor results in clockwise, rotation which moves the barrier from closed to open position. Such reversal may also happen due to placement of head end on the left of the doorway rather than on the right as shown in FIG. 1. When a user determines that the barrier is moving in the opposite direction to that expected the user changes the position of switch 130. At the next command to energize the motor, controller 208 detects the changed setting of switch 130 and directs relays 223 to energize motor 150 for rotation opposite to the energization before the change of switch position. Additionally, controller 208 reverses the sense of the limit switches e.g., 145 and 146 so that proper door operation will result.

Figure 6:
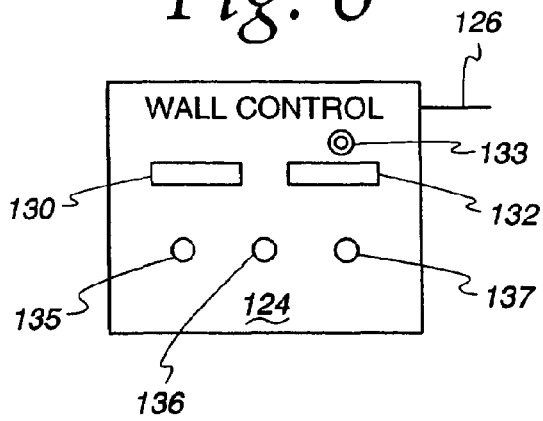
FIG. 6 is a view of a wall control unit for signaling the controller.

The preceding embodiments operate with a timer-to-close timer, the value of which may be set in any manner. The following discusses two examples for setting the timer-to-close timer to a particular value. A first example begins when a user presses the timer learn button [187] *137* for a momentary contact to which controller 208 responds by entering a button oriented learn mode. The button oriented learn mode operates with an optional wall control 124' which is shown in FIG. 6. Wall control 124' replaces wall control 124 for the present example.

In the button oriented learn mode, controller 208 responds to each press of an open button 135 by adding five seconds to the timer count, to each press of a close button 136 by adding one minute to the timer count and responds to a press of a stop button by clearing the timer count. Accordingly, when the button oriented learn mode is operational a user presses a combination of buttons 135 and 136 to total the desired timer value. The absence of button presses for a predetermined period of time e.g., 20 seconds, allows the controller to leave the learn mode and revert to the operating mode.

A second method of setting the time out period of the timer-to-close timer is a time based learn mode which is entered by holding the timer learn button [187] *137* closed for more than five seconds. In the time based learn mode the barrier should be at the open position when button [187] *137* is pressed or the first act after entering the time based learn mode should be to move the barrier to the open position. Controller 208 then counts the time that the barrier is in the open position. When the appropriate time has passed e.g., five minutes, the user presses either the close button 136 (FIG. 6) or the timer-to-close button. The time base for the timer-to-close timer then becomes the time that the barrier was in the open position.

What is claimed is:

1. A barrier movement operator comprising:

a motor for connection to a barrier to move the barrier between open and closed positions;

a controller for controlling the energization of the motor, the controller comprising a routine to energize the motor to move the barrier toward the closed position when the barrier has been at the open position for a predetermined period of time;

a timer for identifying the passage of the predetermined period of time; [and]

inhibiting apparatus for controlling the timer to inhibit the controller from energizing the motor in response to the passage of the predetermined period of time*; and*

*apparatus configured to reset the timer in response to user actuation of the apparatus.*

[2. The barrier movement operator of claim 1 comprising apparatus for resetting the timer.]

3. The barrier movement operator of claim 1 wherein the inhibiting apparatus becomes operative in response to human interaction.

4. The barrier movement operator of claim 3 wherein the inhibiting apparatus is responsive to human interaction for becoming inoperative after becoming operative.

5. The barrier movement operator of claim 1 wherein the timer comprises a timer routine of the controller.

6. The barrier movement operator of claim 5 wherein the controller responds to the inhibiting apparatus by ending execution of the timer routine.

7. The barrier movement operator of claim 5 wherein the controller responds to the inhibiting apparatus by resetting the timer.

8. The barrier movement operator of claim 3 comprising re-activation apparatus for stopping the inhibiting action by the inhibiting apparatus.

9. The barrier movement operator of claim 8 wherein the re-activation apparatus is responsive to human interaction.

10. A barrier movement operator comprising:

a motor for moving a barrier between open and closed positions when energized;

a controller for selectively energizing the motor to move the barrier from the open position toward the closed position when the barrier has been in the open position for a predetermined period of time and for stopping movement of the barrier at a predetermined mid-travel position between the open and closed positions when the barrier is moving because the barrier was at the open position for the pre-determined period of time.

11. The barrier movement operator of claim 10 comprising apparatus responsive to user interaction for energizing the motor to move the barrier from the open position to the closed position.

12. The barrier movement operator of claim 11 wherein the controller energizes the motor without stopping at the mid-travel position when operating in response to user interaction.

13. The barrier movement operator of claim 10 comprising mid-stop apparatus for identifying the predetermined mid-travel position.

14. The barrier movement operator of claim 13 comprising an indicator of the predetermined mid-travel position.

15. The barrier movement operator of claim 14 wherein the indicator comprises a physical switch disposed to change state on passage of the barrier thereby.

16. The barrier movement operator of claim 15 wherein the physical switch comprises electrical contact.

17. The barrier movement operator of claim 15 wherein the physical switch comprises a transmitter and receiver of optical signals.

18. The barrier movement operator of claim 14 wherein the indicator of mid-travel position comprises a software representation of barrier position.

19. The barrier movement operator of claim [15] *18* comprising apparatus for updating the software representation of barrier position as the barrier moves.

20. The barrier movement operator of claim 10 comprising a timer to initiate barrier movement from the mid-travel position toward the closed position.

*21. A barrier movement operator comprising:*

*a motor for connection to a barrier to move the barrier between open and closed positions;*

*a controller for controlling the energization of the motor, the controller comprising a routine to energize the motor to move the barrier toward the closed position when the barrier has been at the open position for a predetermined period of time;*

*a timer for identifying the passage of the predetermined period of time; and*

*inhibiting apparatus for controlling the timer to inhibit the controller from energizing the motor in response to the passage of the predetermined period of time, wherein the inhibiting apparatus becomes operative in response to a human interaction via only a switch and without any other required human interaction and becomes inoperative after becoming operative in response to a second human interaction via the switch and wherein human interaction with the switch effects resetting of the timer.*

*22. The barrier movement operator of claim 21 wherein the switch comprises a contact push button.*

*23. The barrier movement operator of claim 22 wherein the contact push button comprises a momentary contact push button.*

*24. The barrier movement operator of claim 21 wherein the switch comprises a two position switch.*

*25. The barrier movement operator of claim 21 wherein the switch is configured to affect only whether the inhibiting apparatus is operative or inoperative.*

*26. The barrier movement operator of claim 21 wherein the inhibiting apparatus includes an indicator representative of the operational status of the inhibiting apparatus.*

*27. The barrier movement operator of claim 26 wherein the indicator comprises a light emitting diode, LED.*

*28. The barrier movement operator of claim 26 wherein the indicator is active when the inhibiting apparatus is operative and is inactive when the inhibiting apparatus is inoperative.*

* * * * *